Dec. 7, 1937.  J. KACENA ET AL  2,101,797
SHUTTER FOR RADIATOR ENCLOSURES AND THE LIKE
Filed Nov. 7, 1936  2 Sheets-Sheet 1
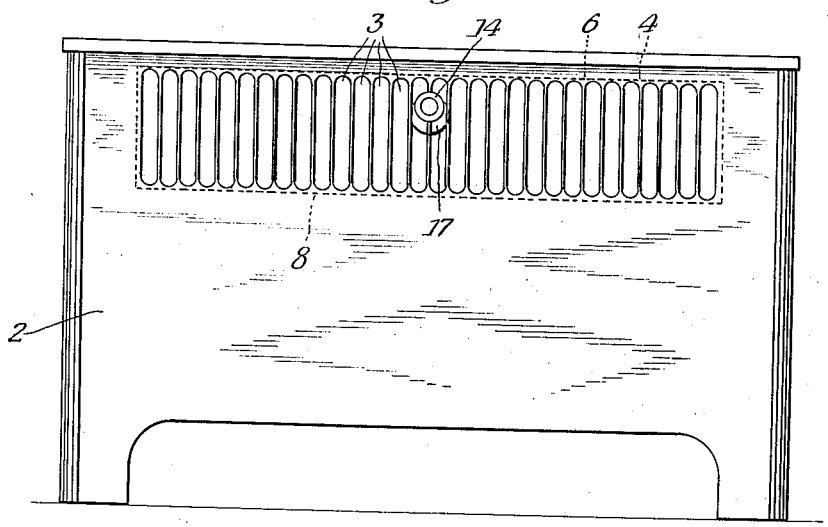
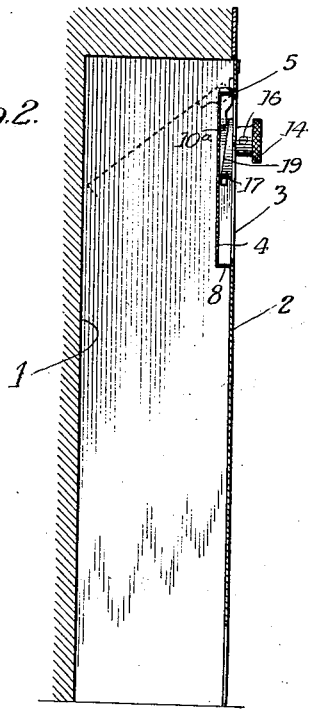
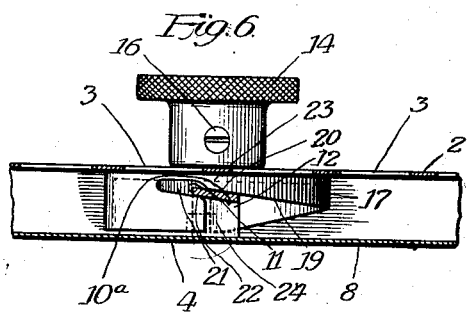
Inventors:
John J. Kacena and
Edward E. Kelly.
By Joseph O. Lange
Atty.

Dec. 7, 1937.　　　J. KACENA ET AL　　　2,101,797
SHUTTER FOR RADIATOR ENCLOSURES AND THE LIKE
Filed Nov. 7, 1936　　　2 Sheets-Sheet 2
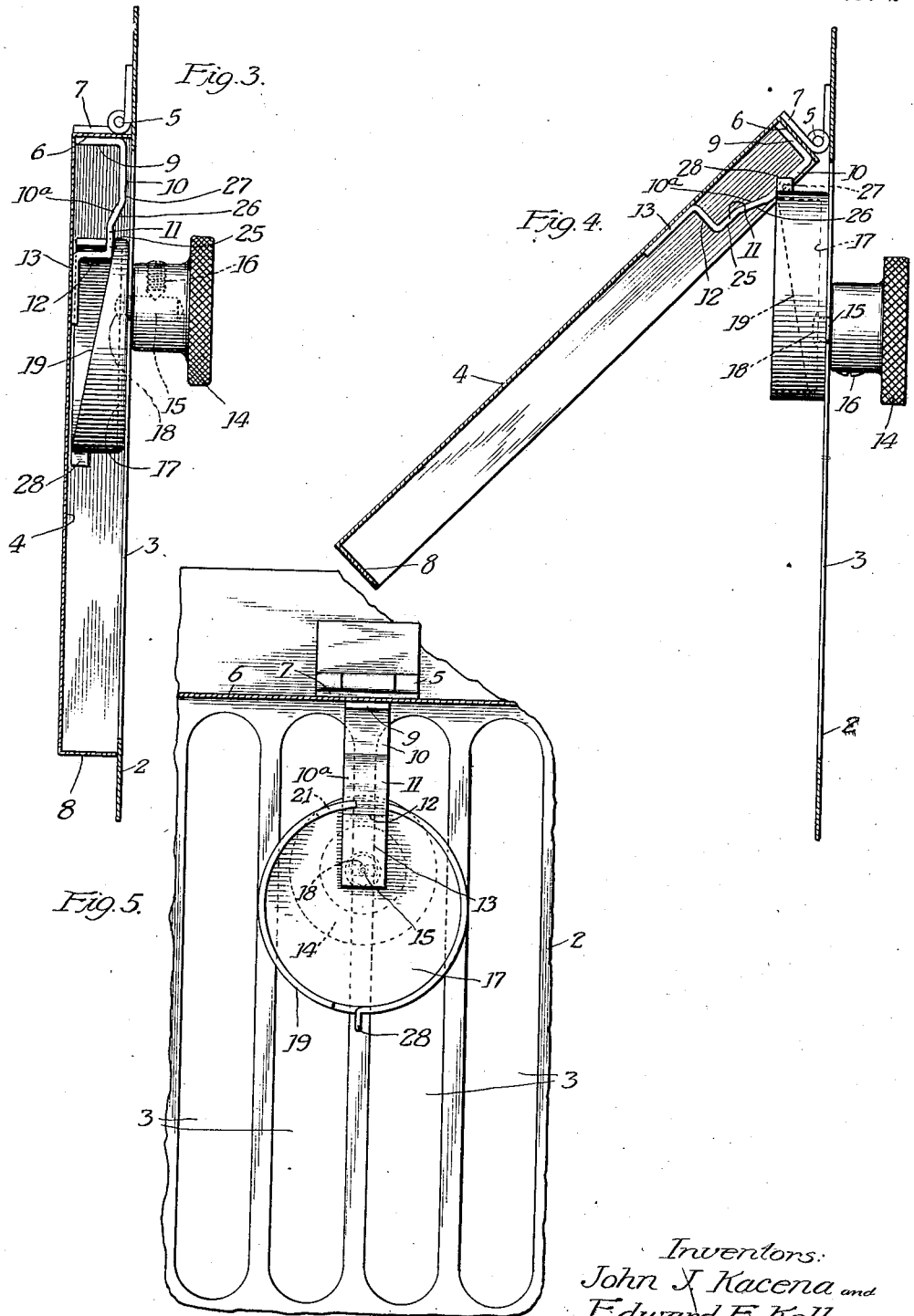
Inventors:
John J. Kacena and
Edward E. Kelly
By Joseph O. Lang Atty.

Patented Dec. 7, 1937

2,101,797

UNITED STATES PATENT OFFICE 2,101,797

SHUTTER FOR RADIATOR ENCLOSURES AND THE LIKE

John Kacena, Chicago, and Edward E. Kelly, Oak Park, Ill., assignors to Crane Co., Chicago, Ill., a corporation of Illinois Application November 7, 1936, Serial No. 109,646

2 Claims. (Cl. 98—106)

More specifically, our invention relates to a shutter operating device which is arranged to close and open the louvers in the front plate of a recessed radiator enclosure, and which is also capable of fine adjustment so as to provide for varied quantities of air as desired to pass through the openings or louvers.

We are aware that there have been previous means used to operate such radiator shutters, as for example, a screw and nut arrangement or employing adjustable rods, but the prior developments have lacked the simplicity, the practicability, and inexpensive adjustability inherent in our invention, enabling a user to exercise prompt and rapid regulation of the circulation of the air through the enclosure.

Another important object is to provide a device in which convenient opening of the shutter accomplished by a single turn or with even less rotative travel of the operating handle will hold the shutter at such position as may be desired.

Another important object lies in the provision for positive closing of the shutter enabling the latter, if desired, to be latched against swivelling movement within the enclosure, using the same means by which movement is imparted to the shutter.

Another object is to provide a device in which the mounting and the operation of the shutter will avoid the tendency to weaken or to distort the relatively thin conventional panel, but in contradistinction to the foregoing objection, in our invention the panel will be stiffened and strengthened by reason of the support contributed by the cam arrangement.

Other objects will appear from reading the following specification in which we describe the invention in connection with the accompanying drawings and in which Fig. 1 is a front elevation of the conventional type of a recessed radiator enclosure with our invention applied thereto.

Fig. 2 is a partly sectional side elevation of the arrangement shown in Fig. 1.

Fig. 3 is a magnified fragmentary partly sectional side view of the operating mechanism or cam member which is used to displace the shutter inwardly and in which view the shutter is shown in closed position with relation to the front plate of the enclosure.

Fig. 4 is a side view similar to that described in Fig. 3 except that the shutter is shown in open position.

Fig. 5 is a front elevation taken from the back of the enclosure.

Fig. 6 is a magnified fragmentary top view of the operating and latching mechanism, hereinafter described.

In the various figures, similar numerals refer to similar parts.

Referring to Fig. 2, the numeral 1 represents a wall recess of a room in which the radiator enclosure 2 is preferably positioned, and the enclosure is provided with the usual open work or grilled front plate 3 through which the warm air from the radiator within the enclosure passes to the room proper. Behind the front plate 3 a shutter plate 4 is positioned preferably suspended swivelably from the hinge 5 having a horizontally extending flange 6 which is suitably welded or otherwise attached to a complementary flange 7 on the hinge 5, the said shutter 4 also having a lower horizontally extending flange 8 which abuts against the lower portion of the plate 3, thus in effect serving as a closure passing over the grille work of the plate.

To the underside of the shutter flange 6 a transverse horizontally extending flat strip metal flange 9 is attached, having a lower substantially vertical depending portion 10. For purposes hereinafter explained, the portion 10 is provided with inwardly stepped section 11, connected by the inclined portion 10a, at the lower end of which is a horizontally extending surface 12 connected as at 13 to the inner surface of the plate 4. At the front portion of the grille of the plate 3 a handle 14 is rotatably mounted upon a shaft 15 held by the setscrew 16 in nonrotatable engagement with a cylindrically formed cam 17 which is eccentrically positioned upon a center as indicated at 18, the back of the cam bearing in abutting relation with the opposite inner surface of the plate 3.

As shown more clearly in Fig. 6, the cam 17 is preferably made with an annular rim portion having a gradually increasing height upon the edge 19 thus forming an inclined plane upon which the inwardly stepped section 11 bears as at 20 when the closure member or shutter 4 is in the closed position. In the latter position it will be noted that the annular rim portion of the cam 17 is provided with a slot or relieved surface 21 which engages the stepped section 11 as at 22 (Fig. 6) thereby holding the shutter plate 4 positively against the back or inner surface of the plate 3, and preventing it from being swung inwardly within the enclosure.

The surface 19 of the cam 17 spirally increases in thickness from the low height shown at 23 to the relatively greater height indicated at 24, preferably acquiring such thickness in approximately half the periphery of the rim, as indicated at 19. Thus when looking at the front exterior of the enclosure, as the handle 14 is rotated in a clockwise direction the first motion will withdraw the recessed portion 11 from the slot 21 and thereby release the shutter so as to permit its inward swivelling movement to follow.

Upon the continued clockwise rotation of the cam 17, since the shutter is no longer held down by the slot 21, the peripherally inclined surface 19 commences to bear against the lower surface 25 of the portion 11 and then moving upon the inclined surface 26 (Fig. 3). By reason of the preferably but not necessarily eccentric positioning of the center 15 with respect to the cam 17, the surface 19 slidably engages the lower depending surface 27 of the flange 10. It will thus be apparent that by reason of the flange 10 being closely positioned to the inner surface of the plate, a rapid inward displacement of the shutter is provided with but slight rotative manipulation of the handle 14. Further movement in a clockwise direction is prevented by the stop lug 28 positioned at the highest portion of the inclined plane 19.

While the cam 17 has been shown in the accompanying drawings as being hollow or of cup shape, it may be made with an open end, employing a spider and hub arrangement, or an offset disc.

Obviously, in returning the shutter to its position of abutment against the grille or front wall of the enclosure, the direction of rotation of the handle 14 is simply reversed, thereby allowing the shutter by its own weight to fall back to the closed position. It is of course further evident that the handle may be so rotated that the cam will support the shutter at any point upon the surface 19 so as to permit the desired opening through the grille.

From the foregoing description it will therefore be evident that a relatively simple as well as a rapid shutter opening adjustment is obtained and that the device can be operated efficiently with a minimum amount of effort upon the part of the user.

A single preferred embodiment of our invention has been described but it should be readily understood that our invention is, of course, capable of numerous modifications, as for example, a plurality of shutters may be operated together by the mechanism described. Therefore, changes in the construction and in the arrangement of the various parts may be made without departing from the spirit or the scope of the invention as determined by the claims appended hereto.

We claim:

1. A radiator enclosure including a front plate having openings therethrough, a shutter swivelably mounted on the back of the said plate for controlling the passage of air through the said openings and means comprising an eccentrically positioned cam rotatably mounted in said plate and operable from the front of the said plate, the said cam being eccentrically positioned with relation to its axis of rotation and having an annular relieved surface spirally inclined whereby upon rotation in one direction of the said cam the said shutter is movable within said enclosure and upon rotation in a reverse direction the said shutter is latched to prevent such movement.

2. A radiator enclosure including a front plate having openings therethrough, a shutter movably mounted on the back of the said plate for controlling the passage of air through the said openings and means comprising a cam rotatably mounted in said plate and operable from the front of the said plate, the said cam having an inclined surface relieved at a portion of its periphery whereby upon rotation of the said cam in one direction the shutter is moved within the said enclosure and upon rotation thereof in a reverse direction the said shutter is latched against such movement.

JOHN KACENA.
EDWARD E. KELLY.